United States Patent Office 3,639,338
Patented Feb. 1, 1972

3,639,338
REACTIVE POLYUREAS, PROCESS OF PREPARING SAME, AND USE THEREOF IN CURING EPOXY RESINS
Robert C. Kuder, Excelsior, Minn., assignor to General Mills, Inc.
No Drawing. Filed May 6, 1968, Ser. No. 727,031
Int. Cl. C08g 30/14
U.S. Cl. 260—47 EN
21 Claims

ABSTRACT OF THE DISCLOSURE

Reactive polyureas prepared from diprimary diamines containing at least one secondary amine group and diisocyanates derived from $C_{36}$ to $C_{44}$ dimerized fat acids. Process of preparing said polyureas using chlorofrm or trichloroethylene as reaction solvent. Use of the polyureas to cure epoxy resins.

---

The present invention relates to new polyureas derived from diisocyanates obtained from dimerized fat acids and diprimary diamines containing one or more secondary amine groups. It also relates to the process of preparing said new polyureas and to the use of the same as epoxy resin curing agents.

The reaction of diisocyanates with simple diprimary or disecondary amines to give linear, soluble polyureas is known. The reactivity of the isocyanate groups towards both primary and secondary amine groups is so great, however, that soluble high-polymeric products cannot ordinarily be made from diisocyanates and diprimary amines which also contain secondary amine groups because of the formation of insoluble cross-linked products. Hitherto, the only known method of obtaining soluble high-molecular polyureas from such polyamines was to block the secondary amine groups by formation of addition products with alcohols.

I have now found that soluble polyureas can be made from diprimary diamines containing one or more secondary amine groups and the diisocyanates derived from dimerized fat acids without the use of alcohol blocking agents. My new process involves the use of chloroform or trichloroethylene as the reaction solvent, keeping of the concentration of the reactans in the solvent at less than about 0.25 molar, adding of the diisocyanate solution to the polyamine solution, and using an over-all molar ratio of diisocyanate to polyamine of not more than 1:1.

When I attempted to make soluble polyureas from the polyamines and the dimerized fat acid based diisocyanates using an alcohol (e.g. n-propanol, n-butanol, or 2-ethoxyethanol) as the solvent, solutions were obtained which were incompatible with epoxy resins. In contrast, the new polyureas of my invention and solutions thereof are compatible with epoxy resins. And accordingly, my new reactive polyureas are unexpectedly good curing agents for the said epoxy resins. In this regard, and in comparison with the well-known polyamide resins—i.e. Versamid® 100 and 115, all of the secondary amine groups from the polyamines remain as such in the polyureas of the present invention. My new polyureas are generally characterized as soft, rubbery or gummy, essentially non-tacky resinous solids whereas solvent-free polyamides are noted for their tack. The polyureas of the instant invention convert epoxy resin films to a tack-free state much more rapidly than do the above-mentioned polyamides.

The diisocyanates useful in the present invention are derived from dimerized fat acids. Such diisocyanates have the following idealized structural formula:

$$OCN(CH_2)_y—D—(CH_2)_yNCO$$

where $y$ is 0 or 1 and D is the divalent hydrocarbon group of the dimerized fat acid. The diisocyanates of the above formula wherein $y$ is 0 are prepared by converting the dimerized fat acids to the corresponding dimeric acid chlorides, reacting the acid chlorides with a metal azide to form the dimeric acyl azides and then heating the acyl azides to produce the diisocyanates. This method of preparation can be conveniently illustrated by the following equations:

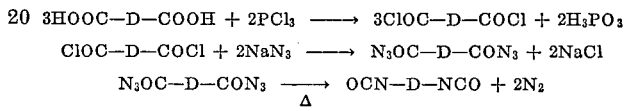

$$3HOOC—D—COOH + 2PCl_3 \longrightarrow 3ClOC—D—COCl + 2H_3PO_3$$
$$ClOC—D—COCl + 2NaN_3 \longrightarrow N_3OC—D—CON_3 + 2NaCl$$
$$N_3OC—D—CON_3 \xrightarrow{\Delta} OCN—D—NCO + 2N_2$$

The diisocyanates wherein $y$ is 1 are prepared by converting the dimeric fat acids to the corresponding dinitriles and then hydrogenating the dinitriles in the presence of ammonia and a catalyst such as Raney nickel to form diamines. The diamines are then reacted with phosgene to give the diisocyanates. This method of preparation can be conveniently illustrated by the following equations:

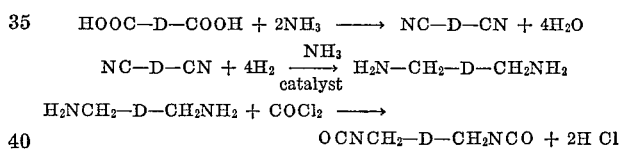

$$HOOC—D—COOH + 2NH_3 \longrightarrow NC—D—CN + 4H_2O$$
$$NC—D—CN + 4H_2 \xrightarrow[\text{catalyst}]{NH_3} H_2N—CH_2—D—CH_2NH_2$$
$$H_2NCH_2—D—CH_2NH_2 + COCl_2 \longrightarrow$$
$$\qquad\qquad\qquad OCNCH_2—D—CH_2NCO + 2H\,Cl$$

The dimeric fat acids, useful as the starting materials for preparing the above diisocyanates, are prepared by polymerizing ethylenically unsaturated monobasic carboxylic acids having 16 to 22 carbon atoms or the lower alkyl esters thereof.

The preferred acids are the mono and polyolefinically unsaturated 18 carbon atom acids. Representative octadecenoic acids are 4-octadecenoic, 5 - octadecenoic, 6-octadecenoic (petroselinic), 7 - octadecenoic, 8 - octadecenoic, cis-9 - octadecenoic (oleic), trans-9-octadecenoic (elaidic), 11 - octadecenoic (vaccenic), 12 - octadecenoic and the like. Representative octadecadienoic acids are 9,12 - octadecadienoic (linoleic), 9,11 - octadecadienoic, 10,12 - octadecadienoic, 12,15 - octadecadienoic and the like. Representative octadecatrienoic acids are 9,12,15 - octadecatrienoic (linolenic), 6,9,12-octadecatrienoic, 9,11,13 - octadecatrienoic (eleostearic), 10,12,14 - octadecatrienoic (pseudo-eleostearic) and the like. A representative 18 carbon atom acid having more than three double bonds is moroctic acid which is indicated to be 4,8,12,15 - octadecatetraienoic acid. Representative of the less preferred (not as readily available commercially) acids are: 7-hexadecenoic, 9-hexadecenoic (palmitoleic), 9 - eicosenoic (gadoleic), 11-eicosenoic, 6, 10,14 - hexadecatrienoic (hiragonic), 4,8,12,16 - eicosotetraenoic, 4,8,12,15,18 - eicosapentanoic (timnodonic), 13-docosenoic (erucic), 11 - docosenoic (cetoleic), and the like.

The ethylenically unsaturated acids can be polymerized using known catalytic or non-catalytic polymerization techniques. With the use of heat alone, the mono-olefinic acids (or the esters thereof) are polymerized at a very slow rate while the polyolefinic acids (or the esters thereof) are polymerized at a reasonable rate. If the double bonds of the polyolefinic acids are in conjugated positions, the polymerization is more rapid than when they are in the non-conjugated positions. Clay catalysts are commonly used to accelerate the dimerization of the unsaturated acids. Lower temperatures are generally used when a catalyst is employed.

The polymerization of the described ethylenically unsaturated acids yields relatively complex products which usually contain a predominant portion of dimerized acids, a smaller quantity of trimerized and higher polymeric acids and some residual monomers. The 32 to 44 carbon atom dimerized acids can be obtained in reasonably high purity from the polymerization product by vacuum distillation at low pressures, solvent extraction or other known separation procedures. The polymerization product varies somewhat depending on the starting fat acid or mixture thereof and polymerization technique employed—i.e. thermal, catalytic, particular catalyst, conditions of pressure, temperature, etc. Likewise, the nature of the dimerized acids separated from the polymerization product also depends somewhat on these factors although such acids are functionally similar.

Attempts have been made to fully delineate the structures of dimerized acids prepared from ethylenically unsaturated acids. These studies have been based largely on the products obtained by polymerizing linoleic acid or the methyl esters thereof or starting materials rich in linoleic acid or methyl linoleate. Paschke and Wheeler, in a study relating principally to the thermal polymerization of normal methyl linoleate, stated that at least two main products had been identified by others as resulting from such polymerization:

$$CH_3(CH_2)_5-CH-CH-CH-CH=CH-(CH_2)_7-COOCH_3$$
$$CH_3(CH_2)_5-CH \qquad CH-(CH_2)_7COOCH_3$$
$$\qquad\qquad CH=CH$$

and $$CH_3(CH_2)_4-CH-CH-CH_2-CH=CH-(CH_2)_7COOCH_3$$
$$CH_3(CH_2)_5-CH \qquad CH-(CH_2)_7COOCH_3$$
$$\qquad\qquad CH=CH$$

Their experimental work then indicated the latter structure predominated in the thermal polymerization product (The Journal of the American Oil Chemists Society, vol. XXVI, No. 6, June 1949, pages 278–83). Moore theorized (using the Diels-Alder mechanism) that the polymerization of linoleic acid would yield a variety of 36 carbon atom acids of high structural similarity (Paint, Oil & Chemical Review, Jan. 4, 1951, pages 13–15, 26–29). Thus it was generalized that a portion of normal linoleic acid having the structure $$CH_3(CH_2)_4(CH=CHCH_2CH=CH(CH_2)_7COOH$$

(depicted for convenience as R—C=C—C—C=C—R′)

would be conjugated during the polymerization to the 9, 11 acid:

$$CH_3(CH_2)_4CH_2CH=CHCH=CH(CH_2)_7COOH$$

(depicted for convenience as R—C—C=C—C=C—R′)
It was then set forth that these acids could polymerize as follows:

R—C—C=C—C=C—R′
   +
R—C=C—C—C=C—R′

→

$$R-C-C \underset{R-C-C-C-C=C-R'}{\overset{C=C}{\diagup \diagdown}} C-R'$$

or

R—C—C=C—C=C—R′
   +
R—C=C—C—C=C—R′

→

$$R-C-C \underset{R-C-C-C-C=C-R'}{\overset{C=C}{\diagup \diagdown}} C-R_1$$

or

R—C—C=C—C=C—R′
   +
R—C=C—C—C=C—R′

→

$$R-C-C \underset{R-C=C-C-C-C-R'}{\overset{C=C}{\diagup \diagdown}} C-R'$$

or

R—C—C=C—C=C—R′
   +
R—C—C=C—C=C—R′

→

$$R-C-C \underset{R-C-C=C-C-C-R'}{\overset{C=C}{\diagup \diagdown}} C-R'$$

Moore further indicated that the 9,12-linoleic acid could also conjugate to the 10,12 acid and that this acid could self-polymerize or polymerize with the 9,12 or 9,11 acids. It was stated that the polymerizations could be "head-to-tail" as well as "head-to-head" as depicted above. Moore further stated that in many instances octadecatrienoic acids are present in many of the naturally occurring raw materials rich in octadecadienoic acids and that the self-polymerization of said acid could be depicted as follows:

R—C=C—C=C—C=C—R′
   +
R—C=C—C=C—C=C—R′

→

$$R-C \underset{C=C}{\overset{C=C-C-C=C-R'}{\diagup \diagdown}} C-C=C-R'$$

However, the author stated that such a product had not been isolated and that a second reaction probably takes place which could yield a diacid of the structure $$R-C=C-C-C \underset{R-C}{\overset{C-C-R'}{\diagup \diagdown}} C-R'$$
$$\underset{C=C}{\diagdown \diagup} C-C$$

Ault et al. gave a possible structure for the dimer of methyl α-eleostearate, an ester of an octadecatrienoic acid, as follows:

$$CH_3-(CH_2)_3-C \overset{CH-CH=CH-CH=CH(CH_2)_7COOCH_3}{\diagup} $$
$$CH_3-(CH_2)_3-CH \qquad CH-CH=CH(CH_2)_7COOCH_3$$
$$\qquad\qquad CH \qquad\qquad CH$$
$$\qquad\qquad\qquad CH$$

However, they also postulated that the structure could in fact be more complicated. Thus it was postulated that further cyclic rings were formed due to the high unsaturation giving a compound having the following proposed structure $$CH_3(CH_2)_3-CH \qquad CH \overset{CH=CH}{\underset{CH-CH(CH_2)_7COOCH_3}{\diagup}}$$
$$CH_3(CH_2)_3-CH \qquad CH$$

(Industrial and Engineering Chemistry, vol. 34, No. 9, September 1942, pages 1120–3).

Other information obtained is in essential agreement with the above studies. Thus analysis of dimerized acids prepared from linoleic acid rich starting materials using heat alone or heat plus a catalyst, such as an acid or alkaline clay, shows that the product contains structurally similar acids having monocyclic tetra-substituted ring structures as well as acids with two and three rings, such additional rings generally being fused to the six carbon atom ring. The clay catalyzed dimerized acids have been shown to contain some aromatic rings according to ultraviolet and infrared spectroscopy. These aromatic rings are believed to be formed by hydrogen transfer (by catalytic action of clay) from a substituted cyclohexene ring to form a substituted benzene ring. Polymerization of pure oleic acid using a clay catalyst has been shown to yield a mixture of dimerized fat acids of which approximately 25–30% by weight have a one-ring cyclic structure with the remainder being non-cyclic. However, when mixtures of oleic and linoleic acids (such as from tall oil) are polymerized, the resulting dimerized fat acid contains little if any dimer having a non-cyclic structure.

It is thus apparent that the polymerization of the ethylenically unsaturated acids yields complex products. The dimer fraction thereof, generally consisting of a mixture of acids, can be assigned the formula:

HOOC—D—COOH where D is a divalent hydrocarbon group containing 30 to 42 carbon atoms. It is also apparent that said divalent hydrocarbon group is complex. However, from the noted studies and other information obtained, it can be seen that a mixture of acids normally results from the polymerization and subsequent fractionation and these acids have structural and functional similarities. Thus such mixture of acids contains a significant proportion of acids having a six carbon atom ring (about 25% or more even when the starting fat acid is a mono-olefinically unsaturated acid such as oleic). The remaining carbon atoms in the divalent hydrocarbon group of such ring containing acids are then divided between divalent and monovalent radicals which may be saturated or ethylenically unsaturated. Such radicals may form one or more additional cyclic structures which are generally fused to the first six membered ring. Many of such dimeric acids may be considered as having a theoretical idealized, general formula as follows:

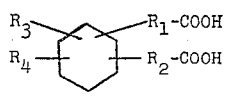

where $R_1$ and $R_2$ are divalent hydrocarbon radicals, $R_3$ and $R_4$ are monovalent hydrocarbon radicals and the sum of the carbon atoms in $R_1$–$R_4$ is 24–36. The ring may be saturated or it may contain one to three double bonds depending on the specific starting material, polymerization conditions and subsequent treatment including hydrogenation. It is also understood that the $R_1$–$R_4$ radicals may form one or more additional cyclic structures which are generally fused to the first ring.

As a practical matter, the dimerized fat acids are preferably prepared by the polymerization of mixtures of acid (or the simple aliphatic alcohol esters—i.e. the methyl esters) derived from the naturally occurring drying and semi-drying oils or similar materials. Suitable drying or semi-drying oils include soybean, linseed, tung, perilla, oiticica, cottonseed, corn, sunflower, dehydrated castor oil and the like. Also, the most readily available acid is linoleic or mixtures of the same with oleic, linolenic and the like. Thus, it is preferred to use as the starting materials, mixtures which are rich in linoleic acid. An especially preferred material is the mixture of acids obtained from tall oil which mixture is composed of approximately 40–45% linoleic and 50–55% oleic. It is also preferred to carry out the polymerization in the presence of a clay. Partial analysis of the dimer fraction obtained from the product prepared by polymerizing the tall oil fatty acids in the presence of 10% by weight of an alkaline montmorillonite clay at a temperature of 230° C. and a pressure of 140 p.s.i. for five hours showed that it was a mixture of $C_{36}$ acids, the major proportion thereof being monocyclic of the above general formula with a substantial amount of the acids having a ring containing three double bonds (aromatic) and saturated side chains.

It is also to be understood that the said acids can be hydrogenated using palladium catalyst. Such mixture of hydrogenated dimeric fat acids was used in the preparation of the diisocyanate used in the examples of the present invention.

Any of a wide variety of aliphatic polyamines having two primary amine groups and one or more secondary amine groups can be used in preparing the reactive polyureas in accordance with the present invention. Such polyamines can be represented by the following formula:

$$H_2N—R—NH_2$$

where R is an aliphatic group containing at least one

linkage in the chain, said secondary amine group or groups being separated from the primary mine groups by at least one carbon atom. The said polyamines contain at least 2 carbon atoms up to 200 or more. Preferably, they contain from 4 to about 50 carbon atoms. They may contain 20 or more secondary amine groups but preferably they contain 1 to about 5 of such groups.

A preferred group of the polyamines are the polyalkylene polyamines of the formula:

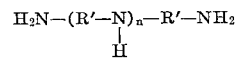

where R' is an alkylene group of 1 to 10 carbon atoms and $n$ is 1 to 20. Preferably R' is an alkylene group of 2 to 5 carbon atoms and $n$ is 1 to 5. Illustrative of such polyalkylene polyamines are diethylene triamine, triethylene tetramine, dipropylene triamine, and the like.

A second preferred group of polyamines are those of the following formula:

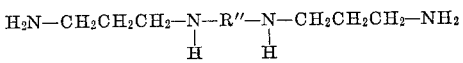

where R'' is an alkylene group of 1 to 20 carbon atoms and preferably 2 to 10 carbon atoms. Illustrative of such polyamines is N,N'-bis(gamma-aminopropyl)-ethylene diamine.

As indicated above, the process of the present invention utilizes as the reaction solvent, either chloroform or trichloroethylene ($Cl_2C=CHCl$). Other solvents such as ethylene dichloride, chlorobenzene, xylene, methyl isobutyl ketone, butyl acetate and dioxane are not operable. The diisocyanate and polyamine are respectively added to the chosen solvent at molar concentrations of less than about 0.25 and then the diisocyanate solution is added to the polyamine solution with stirring, preferably rapid stirring. The reaction temperature is preferably maintained in the range of 0–30° C. although temperatures varying on either side of this range by about 20° C. could also be used. Reaction time is not a controlling variable, as the reaction between the NCO and $NH_2$ groups is very rapid—the actual time involved is merely a function of the cooling available to control the temperature and the rate of addition of the diisocyanate solution to the polyamine solution. The molar ratio of the diisocyanate to the polyamine is not more than 1:1 and is in the range of 1:1–1:2. At the preferred 1:1 ratio, the polyureas are linear having the following idealized formula:

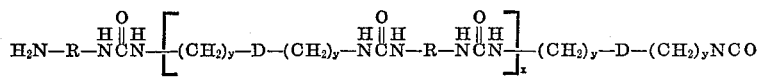

where R, D and y are as above defined and x is the number of repeating units in the polymer chain. Preferably, x is in the range of 1 to about 100. Where a slight excess of the polyamine is employed, all of the end groups would be NH₂ groups as follows:

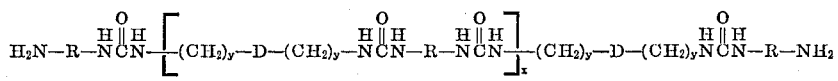

where R, D, y and x are as above defined. Where the diisocyanate to polyamine ratio is 1:2, the following short chain polyurea is obtained

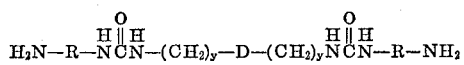

where R, D and y are as defined above.

The novel reactive polyureas are highly useful in the curing of epoxy resins which also forms a part of the present invention. Any epoxy resin can be used in the practice of the present invention. Suitable resins include the reaction products of polyhydric phenols with polyfunctional halohydrins. Typical polyhydric phenols useful in the preparation of such resins include resorcinol and various bis-phenols resulting from the condensation of phenol with aldehydes and ketones such as formaldehyde, acetaldehyde, acetone, methyl ethyl ketone, and the like. A typical epoxy resin of this type is the reaction product of epichlorohydrin and 2,2-bis-p-hydroxyphenyl)propane (Bisphenol A), the resin having the following theoretical structural formula:

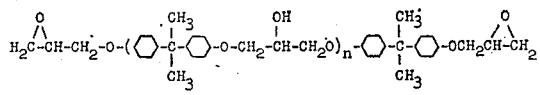

where n is 0 or an integer up to 10. Generally speaking, n will usually be no greater than 3 or 4, and may be 1 or less. However, other types of epoxy resins may be employed.

Another of such epoxy resins are those which are the reaction product of epichlorohydrin and bis-(p-hydroxyphenyl)sulfone. Still another group of epoxy compounds which may be employed are the glycidyl esters of polymeric fat acids. These glycidyl esters are obtained by reacting the polymeric fat acids with polyfunctional halohydrins such as epichlorohydrins. In addition, the glycidyl esters are also commercially available epoxide materials. As the polymeric fat acids are composed largely of dimeric acids, the glycidyl esters thereof may be represented by the following theoretical, idealized formula:

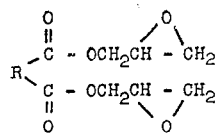

where R is the divalent hydrocarbon radical of dimerized unsaturated fatty acids.

Other types of epoxy resins which may be used with the polyureas in accordance with the present invention and which are commercially available epoxy materials are the polyglycidyl ethers of tetraphenols which have two hydroxy aryl groups at each end of an aliphatic chain. These polyglycidyl ethers are obtained by reacting the tetraphenols with polyfunctional halohydrins such as epichlorohydrin. The tetraphenols used in preparing the polyglycidyl ethers are a known class of compounds readily obtained by condensing the appropriate dialdehyde with the desired phenol. Typical tetraphenols useful in the preparation of these epoxy resins are the alpha, alpha, omega, omega-tetrakis (hydroxyphenyl) alkanes, such as 1,1,2,2-tetrakis (hydroxyphenyl) ethane, 1,1,4,4-tetrakis (hydroxyphenyl) butane, 1,1,4,4-tetrakis (hydroxyphenyl)-2-ethylbutane and the like. The epoxy resin reaction product of epichlorohydrin and tetraphenol may be represented by the following theoretical structural formula:

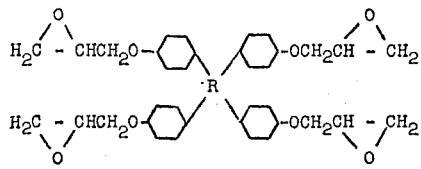

where R is a tetravalent aliphatic hydrocarbon chain having from 2 to 10, and preferably, from 2 to 6 carbon atoms.

Still another group of epoxide materials are the epoxidized novolac resins. Such resins are well known substances and readily available commercially. The resins may be represented by the following theoretical, idealized formula:

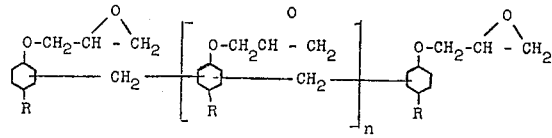

where R is selected from the group consisting of hydrogen and alkyl groups having up to 18 carbon atoms, and n is an integer of from 1 to 10. Generally, n will be an integer in excess of 1 to about 5.

In general, these resins are obtained by epoxidation of the well-known novolac resins. The novolac resins, as is known in the art, are produced by condensing the phenol with an aldehyde in the presence of an acid catalyst, although novolac resins from other aldehydes such as, for example, acetaldehyde, chloral, butyraldehyde, furfural, and the like, may also be used. The alkyl group, if present, may have a straight or a branched chain. Illustrative of the alkylphenol from which the novolac resins may be derived are cresol, butylphenol, tertiary butylphenyl, tertiary amylphenol, hexylphenol, 2-ethylhexylphenol, nonylphenol, decylphenol, dodecylphenol, and the like. It is generally preferred, but not essential, that the alkyl substituent be linked to the para carbon atom of the parent phenolic nucleus. However, novolac resins in which the alkyl group is in the ortho position have been prepared.

The epoxidized novolac resin is formed in the well-known manner by adding the novolac resins to the epichlorohydrin and then adding an alkali metal hydroxide to the mixture so as to effect the desired condensation reaction.

In addition, other epoxy resins which may be used with the polyureas of the present invention are epoxidized olefins, such as epoxidized polybutadiene and epoxidized cyclohexenes, and the diglycidyl ethers of the polyalkylene glycols. These latter ethers are readily available commercially and may be represented by the following theoretical, idealized formula:

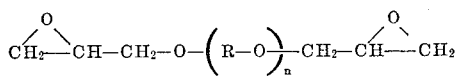

where R is an alkylene radical having from 2–5 carbon atoms and $n$ is an integer of from about 1 to about 50. R is preferably ethylene or propylene or mixtures thereof and $n$ is preferably about 3 to about 10. It is understood that $n$ represents an average figure since the ethers are often prepared from a mixture of glycols—i.e., tripropylene glycol, tetrapropylene glycol, and the like. Said epoxy resins may be prepared in the manner set forth in U.S. Pat. 2,923,696.

In general, the epoxy resins may be described as those having terminal epoxide groups, or at least as having more than one epoxide group per molecule.

In addition, the epoxy resins may be characterized further by reference to their epoxy equivalent weight, the epoxy equivalent weight of pure epoxy resin being the mean molecular weight of the resins divided by the mean number of epoxy radicals per molecule, or in any case, the number of grams of epoxy equivalent to one epoxy group or one gram equivalent of epoxide. The epoxy resinous materials employed in this invention have epoxy equivalent weights from about 140 to about 2000.

The polyureas are used in an amount sufficient to cure the epoxy resin to an insoluble infusible polymer. Preferably they are used in an amount such that the number of amine equivalents in the polyurea is about equal to the number of epoxy equivalents in the epoxy resin. In general, the ratio of amine equivalents to epoxy equivalents may vary from about 10:1 to 1:10.

The following examples illustrate certain preferred aspects of the present invention without limiting the same thereto.

EXAMPLE I

A solution of 30.6 grams (0.05 mole) of dimeryl isocyanate of the formula OCNCH$_2$—D—CH$_2$NCO (D being the hydrocarbon radical of the dimerized acids prepared by polymerizing and hydrogenating the mixture of linoleic and oleic acids obtained from tall oil) in 200 ml. of chloroform was added from a dropping funnel to a solution of 5.15 grams (0.05 mole) diethylene triamine in 200 ml. of chloroform with rapid stirring and with external cooling so as to maintain a temperature of 5–10° C. Evaporation of the solvent from a sample of the resulting clear solution left a soft, rubbery, tack-free film of the reactive polyurea. The remainder of the solution was concentrated in a rotary evaporator to a resin content of 33% by weight, giving a clear solution of the polyurea with a Gardner-Holdt viscosity of X.

When the above procedure was repeated except that 100 ml. of chloroform was used to dissolved each of the diisocyanate and the polyamine, the viscosity of the reaction mixture increased rapidly as the diisocyanate solution was added, and just as all of the diisocyanate was added, the reaction mixture gelled. Neither additional chloroform nor butanol would redissolve the gel.

EXAMPLE II

A solution of 30.6 grams (0.05 mole) of the diisocyanate as used in Example I in 200 ml. of chloroform was reacted with a solution of 7.30 grams (0.05 mole) of triethylene tetramine according to the procedure of Example I. Evaporation of a sample of the resulting clear solution left a soft, rubbery, tack-free film of the polyurea. Another sample of the polyurea was stripped free of solvent in a rotary evaporator leaving a gummy, rubbery polyurea residue which was soluble in dilute acetic acid.

EXAMPLE III

A solution of 53.1 grams (0.088 mole) of diisocyanate as used in Example I in 352 ml. of trichloroethylene was added to a solution of 10.3 grams (0.1 mole) of diethylene triamine in 400 ml. of trichloroethylene with good stirring and with external cooling to maintain the temperature at 25–30° C. The resulting solution was concentrated to a polyurea resin content of 33% by weight, giving a clear solution with a Gardner-Holdt viscosity of V–W.

EXAMPLE VI 4.8 grams of a 50% solution of epoxy resin A (a glycidyl ether having an epoxy equivalent weight of about 525 prepared by condensing Bisphenol A and epichlorohydrin) in a solvent consisting of methyl isobutyl ketone and xylene (2:1 weight ratio) were mixed with 4.8 grams of the 33% polyurea solution of Example I (giving an epoxy resin solids to polyurea solids ratio of 3:2). The resulting solution was clear.

In contrast, the product prepared as follows mixed with the same epoxy resin solution at the same epoxy to product solids ratio of 3 to 2, gave a cloudy mixture which separated in two layers on standing. This product was prepared as in Example I except that butanol was used as the solvent, the reaction temperature was maintained at 27° C. and the product was concentrated to a 50% by weight solids solution in butanol which solution was used with the epoxy resin solution.

EXAMPLE V 4.8 grams of the epoxy resin solution as used in Example IV were mixed with the 33% by weight solids polyurea solution of Example I at various solids ratios and also with a 33% by weight solution of Versamid® 100 in chloroform. These mixtures were filmed on glass and the time (at room temperature) to become tack-free noted. Results were as follows:

| Epoxy/polyurea solids ratio | 3:2 | 1:1 | 2:3 | |
|---|---|---|---|---|
| Epoxy/polyamide solids ratio | | | | 3:2 |
| Tack-free time, minutes | 40 | 45 | 60 | >180 |

EXAMPLE VI

A series of solutions of polyurea products were prepared as follows using the procedure of Example I:

(A) Equimolar amounts of the dimeryl isocyanate and diethylene triamine were reacted using Cellosolve as the solvent instead of chloroform. The resulting solution was concentrated to 50% by weight solids and had a calculated equivalent weight of the solution per

group of 1414.

(B) Equimolar amounts of the dimeryl isocyanate and diethylene triamine were reacted in butanol. The resulting solution was concentrated and thinned with toluene to 50% by weight solids in 3/1 volume ratio of toluene to butanol. The solution had a calculated equivalent weight of 1414.

(C) Equimolar amounts of the dimeryl isocyanate and diethylene triamine were reacted in propanol and concentrated to 50% by weight solids. The solution had a calculated equivalent weight of 1414.

(D) Equimolar amounts of the dimeryl isocyanate and diethylene triamine were reacted in chloroform and concentrated to 33% solids. The calculated equivalent weight of the solution was 2121.

The above solutions were mixed with various epoxy resins at a 1:1 ratio of equivalents. If the resulting mixture was compatible (i.e. miscible), a three-mil film of the mixture was spread on glass and allowed to stand at room temperature. Curing was judged by whether or not the film became tack-free overnight. Results are shown in the following table.

TABLE

| Experiment | Epoxy resin | Polyurea solution | Compatibility [1] | Film curability |
|---|---|---|---|---|
| 1 | B [2] | A | I | |
|   | B | D | C | OK. (tack-free in 3 hr. or less.) |
| 2 | C [3] | B | C | No. (still tacky overnight). |
|   | C | D | C | OK. (tack-free overnight). |
| 3 | D [4] | C | C | No. (tack-free time >2 days). |
|   | D | D | C | OK. (tack-free overnight). |

[1] I=incompatible; C=compatible.
[2] A glycidyl ether having an epoxy equivalent weight of 450 prepared by condensing Bisphenol A and epichlorohydrin. It was used as a 60% by weight solids solution in Cellosolve, the equivalent weight of the solution per epoxy group being about 750.
[3] A glycidyl ether having an epoxy equivalent weight of about 190 prepared by condensing Bisphenol A and epichlorohydrin.
[4] The triglycidyl ether of glycerol having an equivalent weight of about 150.

The above data show that polyureas prepared according to the present invention and represented by solution D above give compatible solutions and curable films whereas products made and used in alcohols were either incompatible or did not cure the epoxy resins in any reasonable time period.

It is to be understood that the invention is not to be limited to the exact details of operation or the exact compositions shown or described, as obvious modifications and equivalents will be apparent to those skilled in the art and the invention is to be limited only by the scope of the appended claims.

The embodiments of the invention in which an exclusive property or privilege is claimed are defined as follows:

1. A reactive polyurea having the formula:

$$H_2N-R-N\overset{H}{\underset{}{}}\overset{O}{\underset{}{\|}}\overset{H}{\underset{}{}}N-\left[(CH_2)_y-D-(CH_2)_y-N\overset{H}{\underset{}{}}\overset{O}{\underset{}{\|}}\overset{H}{\underset{}{}}N-R-N\overset{H}{\underset{}{}}\overset{O}{\underset{}{\|}}\overset{H}{\underset{}{}}N-\right]_x(CH_2)_y-D-(CH_2)_yNCO$$

where y is 0 or 1, D is the divalent hydrocarbon group of dimerized fat acids and contains 30 to 42 carbon atoms, R is an aliphatic group containing at least one $$-\underset{H}{N}-$$

linkage in the chain, said secondary amine group or groups being separated from the urea or NH₂ groups by at least one carbon atom, and x is the number of repeating units in the polymer chain.

2. A polyurea according to claim 1 where y is 1 and x is 1 to about 100.

3. A polyurea according to claim 2 where D contains 34 carbon atoms.

4. A polyurea according to claim 3 where R has the formula.

$$-(R'-\underset{H_n}{N_n}-R'$$

where R' is an alkylene group of 1 to 10 carbon atoms and n is 1–20.

5. A polyurea according to claim 4 where R' is ethylene and n is 1.

6. A polyurea according to claim 4 where R' is ethylene and n is 2.

7. A reactive polyurea having the formula:

$$H_2N-R-N\overset{H}{\underset{}{}}\overset{O}{\underset{}{\|}}\overset{H}{\underset{}{}}N-\left[(CH_2)_y-D-(CH_2)_y-N\overset{H}{\underset{}{}}\overset{O}{\underset{}{\|}}\overset{H}{\underset{}{}}N-R-N\overset{H}{\underset{}{}}\overset{O}{\underset{}{\|}}\overset{H}{\underset{}{}}N-\right]_x(CH_2)_y-D-(CH_2)_y-N\overset{H}{\underset{}{}}\overset{O}{\underset{}{\|}}\overset{H}{\underset{}{}}N-R-NH_2$$

where y is 0 or 1, D is the divalent hydrocarbon group of dimerized fat acids and contains 30 to 42 carbon atoms, R is an aliphatic group containing at least one $$-\underset{H}{N}-$$

linkage, said secondary amine group or groups being separated from the urea or NH₂ groups by at least one carbon atom and x is the number of repeating units in the polymer chain.

8. A polyurea according to claim 7 where y is 1, x is 1 to about 100, D contains 34 carbon atoms, and R has the formula $$-CH_2CH_2-\underset{H}{N}-CH_2CH_2-$$

9. A reactive polyurea having the formula:

$$H_2NR-N\overset{H}{\underset{}{}}\overset{O}{\underset{}{\|}}\overset{H}{\underset{}{}}N-\left(CH_2\right)_y-D-(CH_2)_yN\overset{H}{\underset{}{}}\overset{O}{\underset{}{\|}}\overset{H}{\underset{}{}}N-R-NH_2$$

where y is 0 or 1, D is the divalent hydrocarbon group of dimerized fat acids and contains 30 to 42 carbon atoms and R is an aliphatic group containing at least one $$-\underset{H}{N}-$$

linkage, said secondary amine group or groups being separated from the urea or NH₂ groups by at least one carbon atom.

10. A polyurea according to claim 9 where y is 1, D contains 34 carbon atoms and R is $$-CH_2CH_2-\underset{H}{N}-CH_2CH_2-$$

11. A process of preparing a reactive polyurea which comprises adding a solution of a diisocyanate of the formula $$OCN(CH_2)_yD-(CH_2)_yNCO$$

where y is 0 or 1 and D is the divalent hydrocarbon radical of a dimerized fat acid and contains 30 to 42 carbon atoms, in chloroform or trichloroethylene to a solution of a polyamine having the formula H₂N—R—NH₂, where R is an aliphatic group containing at least one $$-\underset{H}{N}-$$

linkage which secondary amine group is separated by at least one carbon atom from the NH₂ groups, in chloroform or trichloroethylene with stirring at temperatures in the range of about −20° C. to 50° C., the concentration of the diisocyanate and the polyamine being less than 0.25 molar in the chloroform or trichloroethylene and the molar ratio of diisocyanate to polyamine being in the range of 1:1 to 1:2.

12. The process of claim 11 where the polyurea is recovered from the solvent.

13. The process of claim 11 where D contains 34 carbon atoms, y is 1, the polyamine has the formula

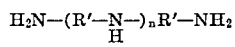

where R′ is an alkylene group of 1 to 10 carbon atoms and $n$ is 1–20, and the molar ratio of diisocyanate to polyamine is 1:1.

14. The process of claim 13 where R′ is ethylene and $n$ is 1.

15. The process of curing epoxy resins which comprises reacting an epoxy resin having terminal

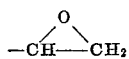

groups with a sufficient amount of the polyurea of claim 1 to produce an insoluble, infusible polymer.

16. The process of claim 15 wherein the epoxy resin is a glycidyl ether of 2,2-bis(p-hydroxyphenyl)propane and epichlorohydrin.

17. The insoluble, infusible polymer prepared by the process of claim 15.

18. The process of curing epoxy resins which comprises reacting an epoxy resin having terminal

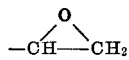

groups with a sufficient amount of the polyurea of claim 7 to produce an insoluble, infusible polymer.

19. The insoluble, infusible polymer prepared by the process of claim 18.

20. The process of curing epoxy resins which comprises reacting an epoxy resin having terminal

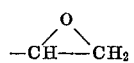

groups with a sufficient amount of the polyurea of claim 9 to produce an insoluble, infusible polymer.

21. The insoluble, infusible polymer prepared by the process of claim 20.

References Cited

UNITED STATES PATENTS 2,852,494  9/1958  Lehmann et al. __ 260—77.5 CH

FOREIGN PATENTS 1,124,240  9/1962  Germany _____ 260—47

OTHER REFERENCES

Belgian Patent Report Nos. 12/67 & 13/67, 260/77.5 CH, May 1967.

General Mills CDS 10–65 pub. 260/77.5 CH, January 1966.

General Mills CDS 14–65 pub. 260/77.5 CH.

WILLIAM H. SHORT, Primary Examiner

T. E. PERTILLA, Assistant Examiner

U.S. Cl. X.R.

260—50 R, 59 R, 77.5 CH, 94.7 R, 553

PO-1050
(5/69)

UNITED STATES PATENT OFFICE
CERTIFICATE OF CORRECTION

Patent No. 3,639,338          Dated February 1, 1972

Inventor(s)  Robert C. Kuder

It is certified that error appears in the above-identified patent and that said Letters Patent are hereby corrected as shown below:

Column 1, line 46, "reactans" should read -- reactants --; line 16, "chlorofrm" should read -- chloroform --. Column 3, line 65, the left-hand portion of the formula reading "$CH_3(CH_2)_4(CH=CHCH_2CH=$" should read -- $CH_3(CH_2)_4CH=CHCH_2CH=$ --. Column 4, lines 6-9, the lower left-hand portion of the formula reading "R-C=C-C-C=C-R'" should read -- R-C-C=C-C=C-R' --; lines 6-9, the right-hand portion of the formula reading ">C-R$_1$" should read -- >C-R' --. Column 5, line 65, "acid" should read -- acids --. Column 6, line 30, "mine" should read -- amine --. Column 7, line 43, "2,2-bis-p-hydroxyphenyl)" should read -- 2,2-bis-(p-hydroxyphenyl) --. Column 9, line 73, "dissolved" should read -- dissolve --. Column 10, line 27, "EXAMPLE VI" should read -- EXAMPLE IV --. Column 11, lines 74-76, the formula reading "$-(R'-N_n-R'$"        should read   -- $-(R'-N)_n-R'$ --
         $|$                                   $|$
         $H_n$                                  H Signed and sealed this 4th day of July 1972.

SEAL)
ttest:

DWARD M.FLETCHER, JR.            ROBERT GOTTSCHALK
testing Officer                   Commissioner of Patents